United States Patent
Biskup et al.

(10) Patent No.: US 8,391,591 B2
(45) Date of Patent: Mar. 5, 2013

(54) METHOD FOR MEASURING THE GROWTH OF LEAF DISKS OF PLANTS AND APPARATUS SUITED THEREFOR

(75) Inventors: Bernhard Biskup, Lohmar (DE); Andreas Fischbach, Juelich (DE); Hanno Scharr, Juelich (DE)

(73) Assignee: Forschungszentrum Juelich GmbH, Juelich (DE)

( * ) Notice: Subject to any disclaimer, the term of this patent is extended or adjusted under 35 U.S.C. 154(b) by 57 days.

(21) Appl. No.: 12/998,663

(22) PCT Filed: Nov. 11, 2009

(86) PCT No.: PCT/DE2009/001601
§ 371 (c)(1),
(2), (4) Date: Jun. 7, 2011

(87) PCT Pub. No.: WO2010/063252
PCT Pub. Date: Jun. 10, 2010

(65) Prior Publication Data
US 2011/0222737 A1    Sep. 15, 2011

(30) Foreign Application Priority Data
Dec. 3, 2008  (DE) .................... 10 2008 060 141

(51) Int. Cl.
*G06K 9/00*  (2006.01)
*G06K 9/40*  (2006.01)
(52) U.S. Cl. .................. 382/154; 382/110; 382/254
(58) Field of Classification Search .................. None
See application file for complete search history.

(56) References Cited

U.S. PATENT DOCUMENTS

| 4,573,191 | A | * | 2/1986 | Kidode et al. | 382/106 |
| 4,656,594 | A | * | 4/1987 | Ledley | 702/19 |
| 5,253,302 | A | * | 10/1993 | Massen | 382/110 |
| 5,659,623 | A | * | 8/1997 | Conrad | 382/110 |
| 6,236,739 | B1 | * | 5/2001 | Conrad | 382/110 |
| 6,301,370 | B1 | | 10/2001 | Steffens et al. | |
| 2010/0322477 | A1 | * | 12/2010 | Schmitt et al. | 382/103 |

FOREIGN PATENT DOCUMENTS

DE    699 22 183    12/2005

OTHER PUBLICATIONS

Biskup B., Scharr H., Schurr U. & Rascher U. (2007) A Stereo capture system for measuring structural parameters of plant canopies. Plant, Cell and Environ. 30, 1299-1308.
Dijkstra E.W. (1959) A note on two problems in connexion with graphs. Numer. Math. 1: 269-271.

(Continued)

*Primary Examiner* — Manav Seth
(74) *Attorney, Agent, or Firm* — Jordan and Hamburg LLP

(57) ABSTRACT

Disclosed is a method and an apparatus for measuring the growth of leaf disks. The method comprises the following steps: a) Calibrating the capture system, b) capturing at least 2 images of a leaf disk, c) processing the image data, comprising i) segmenting the leaf disks by threshold segmentation, ii) multiple morphological erosion steps, iii) edge cleaning to remove the edge of the storage vessel, d) 3D reconstruction: generating a disparity map by means of a stereo algorithm, calculating a 3D surface model based on the previously determined calibration parameters from the disparity map, e) smoothing the previously obtained surface model, f) determining the growth rates from the time series of the areas. The apparatus comprises at least one camera, a lighting unit, a translation table in the X/Y plane for the camera and (infrared) lighting, storage vessels for leaf disks, and electronic evaluation and control units.

16 Claims, 15 Drawing Sheets

OTHER PUBLICATIONS

Ellis C.A. (1999) Workflow technology. In: Beaudouin-Lafon, M. (Ed.), Computer Supported Co-operative Work Trends in Software 7, 29-54. John Wiley & Sons Ltd., Chichester, UK.

Faugeras O., Hotz B., Mathieu H., Viéville T., Zhang Z., Fua P., Théron E., Moll L., Berry G., Vuillemin J., Bertin P., Proy C. (1993) Real time correlation-based stereo: algorithm implementations and applications. Technical Report 2013, INRIA Sophia Antipolis.

Granier C., Aguirrezabal L., Chenu K., Cookson S. J., Dauzat M., Hamard P., Thioux J., Rolland G., Bouchier-Combaud S., Lebaudy A., Muller B., Simonneau T. & Tardieu F. (2006) Phenopsis, an automated platform for reproducible phenotyping of plant responses to soil water deficit in *Arabidopsis thaliana* permitted the identification of an accession with low sensitivity to soil water deficit. New Phytol. 169, 623-635.

Jähne B. (2002) Digital Image Processing (3rd ed.): Concepts, algorithms, and scientific applications. Springer-Verlag, London, UK.

Jenness JS (2004) Calculating landscape surface area from digital elevation models. Wildlife Society Bulletin 32, 829-839.

Kaminuma E., Heida N., Tsumoto Y., Yamamoto N., Goto N., Okamoto N., Konagaya A., Matsui M., and Toyoda T. (2004) Automatic quantification of morphological traits via three-dimensional measurement of *Arabidopsis*. Plant J. 38, 358-65.

Klette R., Zamperoni P., (1995) Handbuch der Operatoren für die Bildverarbeitung [Handbook of operators for image processing]. Braunschweig-Vieweg, 2nd edition.

Scharr H. (2004). Optimal filters for extended optical flow. In International Workshop on Complex Motion (IWCM) 14-29.

Russ J.C. (2002) The image processing handbook. CRC Press, Inc., Boca Raton, FL.

Walter A, Schurr U (1999) The modular character of growth in *Nicotiana tabacum* plants under steady-state nutrition. J. Exp. Bot. 50: 1169-1177.

Walter A. (2000) Räumliche und zeitliche Wachstumsmuster in Wurzeln und Blättern dikotyler Pflanzen [Spatial and temporal growth patterns in roots and leaves of dicotyledonous plants]. Dissertation, Univ. Heidelberg.

Walter A., Scharr H., Gilmer F., Zierer R., Nagel K. A., Ernst M., Wiese A., Virnich O., Christ M. M., Uhlig B., Jünger S. & Schurr U. (2007) Dynamics of seedling growth acclimation towards altered light conditions can be quantified via Growscreen: a setup and procedure designed for rapid optical phenotyping of different plant species. New Phytol. 174, 447-455.

Zhang Z. (1999) Flexible camera calibration by viewing a plane from unknown orientations. In: Int. J. Comput. Vision 666-673.

Zhang Z. (2000) A flexible new technique for camera calibration. IEEE T. Pattern Anal. 22: 1330-1334.

Achim Walter et al.: Dynamics of seedling growth acclimation towards altered light conditions can be quantified via Growscreen: a setup and procedure designed for rapid optical phenotyping of different plant species: New Phytologist, Bd. 174, Nr. 2, Feb. 2, 2007, Seiten 447-455, XP7912125 DOI: 10.1111/j.1469-8137 .2007.02002.x Zusammenfassung; Abbildungen 1, 7.

Bernhard Biskup, Hanno Scharr, Ulrich Schurr, Uwe Rascher: A stereo imaging system for measuring structural parameters of plant canopies: Plant, Cell & Environment, Bd. 30, Nr. 10, Jul. 4, 2007, Seiten 1299-1308, XP7912123 ISSN: 0140-7791 DOI: 10.1111/j. 1365-3040.2007.01702.x Zusammenfassung; Abschnitte "Stereo Camera System", "Case Studies".

Biskup B, Scharr H, Fischbach A, Wiese-Klinkenberg A, Schurr U, Walter A: "Diel growth cycle of isolated leaf discs analyzed with a novel, high-throughput three-dimensional imaging method is identical to that of intact leaves" Plant Physiology Bd. 149, Nr. 3, Jan. 23, 2009, Seiten 1452-1461, XP007912120 DOI: 10.1104/pp. 108. 134486; das ganze Dokument.

\* cited by examiner

METHOD FOR MEASURING THE GROWTH OF LEAF DISKS OF PLANTS AND APPARATUS SUITED THEREFOR

BACKGROUND OF THE INVENTION

The invention relates to a method for measuring the growth of leaf disks and to an apparatus suited therefor.

Plant growth is an important cultivation characteristic and is of equally great interest for the analysis of metabolic processes and the influence of active substances on growth.

The use of entire plants results in large space requirements. Moreover, only certain growth habits (notably rosette plants; Walter et al. 2007) are suited for measuring entire leaves. As the coverage of the plant grows with increasing age, such methods are limited to the very early plant stages.

As an alternative to entire plants, the prior art also uses punched-out leaf disks. Punched-out leaf disks will continue grow for days in suitable nutrient solutions (Walter 2000). This allows measurement of the growth of numerous plants in a space-saving manner, with high throughput. Moreover, leaf disks allow for easy application of active substances.

Conventional methods for optically measuring leaf growth generally use entire plants. The optical determination of the surface of individual plants is carried out either in two dimensions, which is to say by measuring the projected leaf area (Granier et al. 2006; Walter et al. 2007) or three dimensions, which is to say with a surface model obtained using a laser scanner or stereo camera (Kaminuma et al. 2004). In addition, commercially available systems exist for measuring the area of leaf disks located on a fixed subsurface (for example, LemnaTec GmbH). The latter are used, for example, to quantify feeding damage by herbivores or damage caused by fungal diseases.

Leaf disks for growth experiments must float freely in solution because a solid base significantly impairs the growth. The subsiding liquid level over the course of the experiment decreases the projected area, which is superimposed with the actual increase in area. Conventional optical 2D measurement methods are therefore not able to determine the actual growth rate. For leaf disks that have high growth rates, the subsiding liquid level only causes the actual growth rates to be underestimated. For leaf disks with lower growth rates (in the range of the seemingly negative growth measured as a result of the subsidence), no meaningful measurement is possible at all. Because a large number of plants have pronounced diurnal growth cycles, the measurement of the actual growth rates is immensely important.

Inclined or curved leaf disks (the latter occurs, for example, under the action of phytohormones) lead to a smaller projected area. Growth can also not be measured using non-stereo methods.

SUMMARY OF THE INVENTION

It is therefore an object of the invention to create a method which makes it possible to precisely measure growth (which is to say, the increase in area of the leaf disks) and to resolve the daytime-dependent dynamics of growth. It is a further object of the invention to be able to carry out standardized growth measurements on a wide pallet of plant species.

It has been shown that it is possible, with the method and the apparatus according to the invention, to carry out growth measurements with high throughput using sample volumes of approximately 500 leaf disks, for example, and to capture or resolve the growth and the daytime-dependent dynamics of the growth at intervals of approximately 1 to 1.5 hours. The method and the apparatus according to the invention enable a high-resolution analysis of the growth of leaf disks in terms of time. After adjustment and calibration, the method and the apparatus can be operated without further support and without the use of staff, in an automated fashion for two to five days, and up to approximately two weeks.

With use of the method and the apparatus according to the invention, it is possible to enable the actual growth rate (in relation to the optical detection) of plants based on leaf disks. Previously, this was not possible using the optical measuring methods known from the prior art.

The present invention relates to a method for measuring the growth of leaf disks, comprising the following method steps:

1. Calibrating the Capture System:

The camera can be calibrated using a standard method, for example, according to Bouguet, 2005. However, other methods known from the prior art are also possible. Separate stereo calibration is not required because the relative positions of the camera are predefined. Knowledge of the calibration parameters is required for the subsequent 3D reconstruction. The parameters determined in this step are: focal length, principal point (=point of intersection of the optical axis with the image plane), radial and tangential distortion.

2. Image Capture:

Depending on the stereo method that is selected, either a) two images can be captured for correlation-based methods (Faugeras et al., 1996) or b) >2 images can be captured for methods that determine the optical flow by means of derivative filters (Scharr et al., 2007), for each leaf disk. A larger number of images in the method allows for a considerable reduction in the systematic error (Scharr, 2004). A sufficiently small stereo base line is achieved by displacing the same camera using a third translation stage. Instead of a third translation stage, it is possible to use two cameras. The cameras used can be, for example, industrial cameras or stereo cameras.

3. Processing of the Image Data:

In order to evaluate the image data, the leaf disks floating freely in nutrient solution must be separated from the background, or the image data of the leaf disks must be segmented. Because an infrared filter is used, only gray scale images are available for segmentation.

First, a) threshold segmentation (for example Jähne, 2002) is carried out. Other methods known from the prior art for threshold segmentation are also suitable. To this end, pixel by pixel choices and selections are made according to the background/leaf disk.

Afterwards, potential leaf disks are identified by first removing edge regions (for example, vessel wall, reflections on the liquid surface), using b) multiple morphological erosion steps, and the remaining objects having a minimal size (in pixels) are then selected.

After this, c) edge cleaning is carried out, wherein the edge of the vessel in which the leaf disk is located is selected out. (see FIG. 9)

4. 3D Reconstruction:

A disparity map is generated using a stereo algorithm (for example, Biskup et al., 2007).

In connection with the stereo camera, stereo vision, and depth image evaluation, disparity or deviation is the offset in the position that the same object takes on during imaging in two different image planes. The focal points associated with the image planes are spatially separated from each other by the base b. Using the focal length f of the two lenses, the following relationship is obtained: $r=bf/D$, where D denotes the disparity. In this way, the distance r from an object can be determined by measuring the disparities in the stereo image.

Post-Processing of the Disparity Image

Outliers, which is to say individual 3D points that are far removed from points of the surroundings, are removed by a median filter (for example, Jähne, 2002). Regions in which, for example due to insufficient contrast, no disparity assessment is possible, are closed by means of normalized convolution (Knutson & Westin, 1993). Thereafter, a 3D surface model is calculated based on the previously determined calibration parameters from the disparity map (for example, Jeness, 2004).

5. Smoothing and Measuring the Surface:

The previously obtained surface model is smoothed using a Gaussian filter on the Z-image (for example, Jähne, 2002) so as to prevent overestimation of the area measurement due to noise.

6. Growth Rates:

Relative growth rates are determined from the time series of the areas. The measured growth rates are provided to a database for further evaluation.

The core of the invention is the use of stereo imaging, by means of which a 3D surface model of the leaf disks is obtained, which allows for exact measurement of the area.

Leaf disks are supported on a horizontal surface, for example in microtiter plates or Petri dishes. The leaf disks are optically captured using the capture system, comprising at least one camera, LED arrays and translation stages. Using X-Y translation stages, the camera system can be positioned over the respective leaf disk. The camera system comprises, for example, a plurality of infrared LED lighting groups, which evenly illuminate the captured plant. The position of the lighting remains stationary, while different camera positions are assumed by means of a third translation stage. The lighting for the image capture is preferably done in the infrared range to prevent physiological effects on the plants. Accordingly, the camera is equipped with an infrared filter to ensure constant lighting intensity to as great an extent as possible, independently of the external lighting. Photosynthetically active lighting can take place in a defined day-night cycle using fluorescent lamps or other light sources emitting photosynthetically usable wavelengths. The method can be carried out in a climate chamber so as to ensure a defined temperature and humidity.

The method according to the invention allows for simultaneous measurement of approximately 500 leaf disks, for example. Experiments using different active substances have shown that, in the case of low growth rates under the action of herbicides, the method according to the invention determines growth rates that are correct (which is to say, not distorted by projection effects). In contrast, when using the projected area, seemingly negative growth was shown under the action of herbicides.

Using a conveyor belt, for example, the number of cyclically measured microtiter plates can be increased.

The number of cyclically measured microtiter plates can be increased, for example, by using a storage apparatus for microtiter plates and a robotic arm.

Instead of a large and expensive climate chamber, the apparatus according to the invention can be accommodated, for example, in an air-conditioned housing. The method and the apparatus according to the invention could therefore be used substantially self-sufficiently, for example in a laboratory room that is not air-conditioned.

The invention further relates to an apparatus that is suited for the method described above.

This apparatus comprises at least one camera having an infrared filter, infrared lighting, translation stages in the X/Y plane for the camera and infrared lighting, storage vessels for leaf disks, and electronic evaluation and control units.

BRIEF DESCRIPTION OF THE DRAWINGS

The figures show, by way of example, embodiments of the method and the apparatus according to the invention and results of growth measurements.

The final segmentation mask $M_s$ receives those pixels of $M_t$ that are located within a perimeter r around the center of gravity of a detected leaf disk and had the value 1 in $M_t$.

Figure 10:
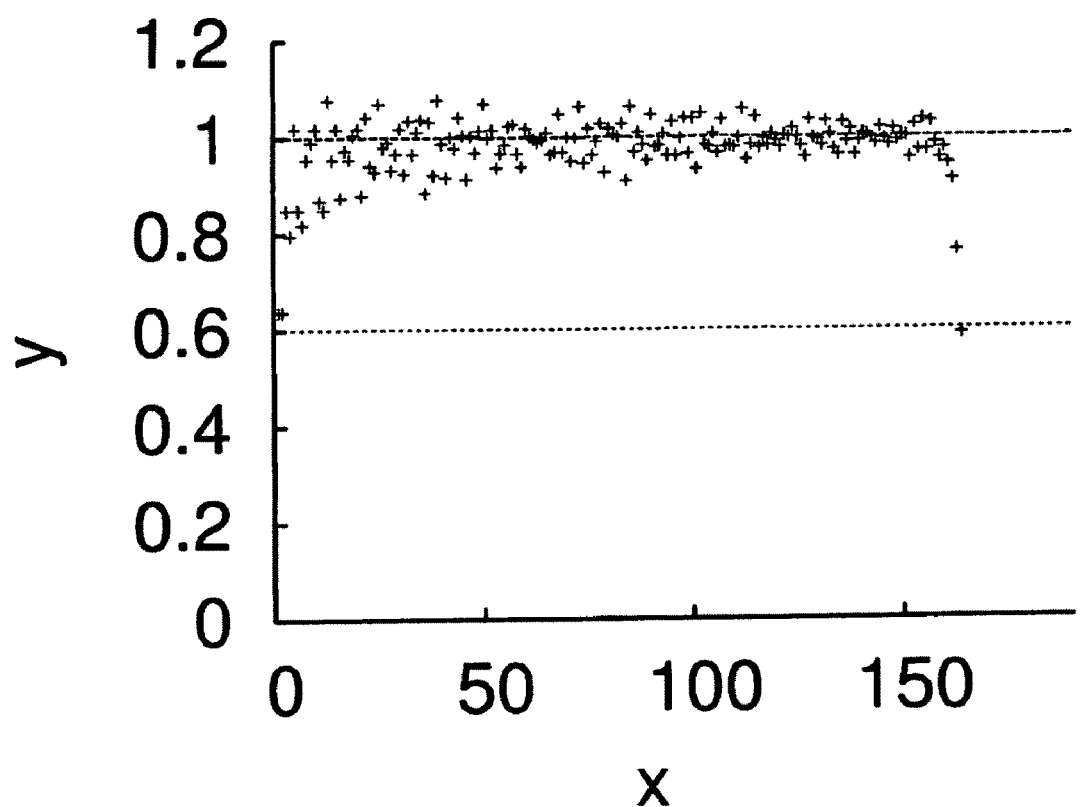

FIG. 10 shows the increase in area as the distance from the center of gravity increases, $$x: \frac{\partial A_p}{\partial r}$$

(pixel), y: r (pixel). Crosses: measured increased; dotted line: theoretical increase of a closed circle with increasing r, 2πr.

Figure 11:
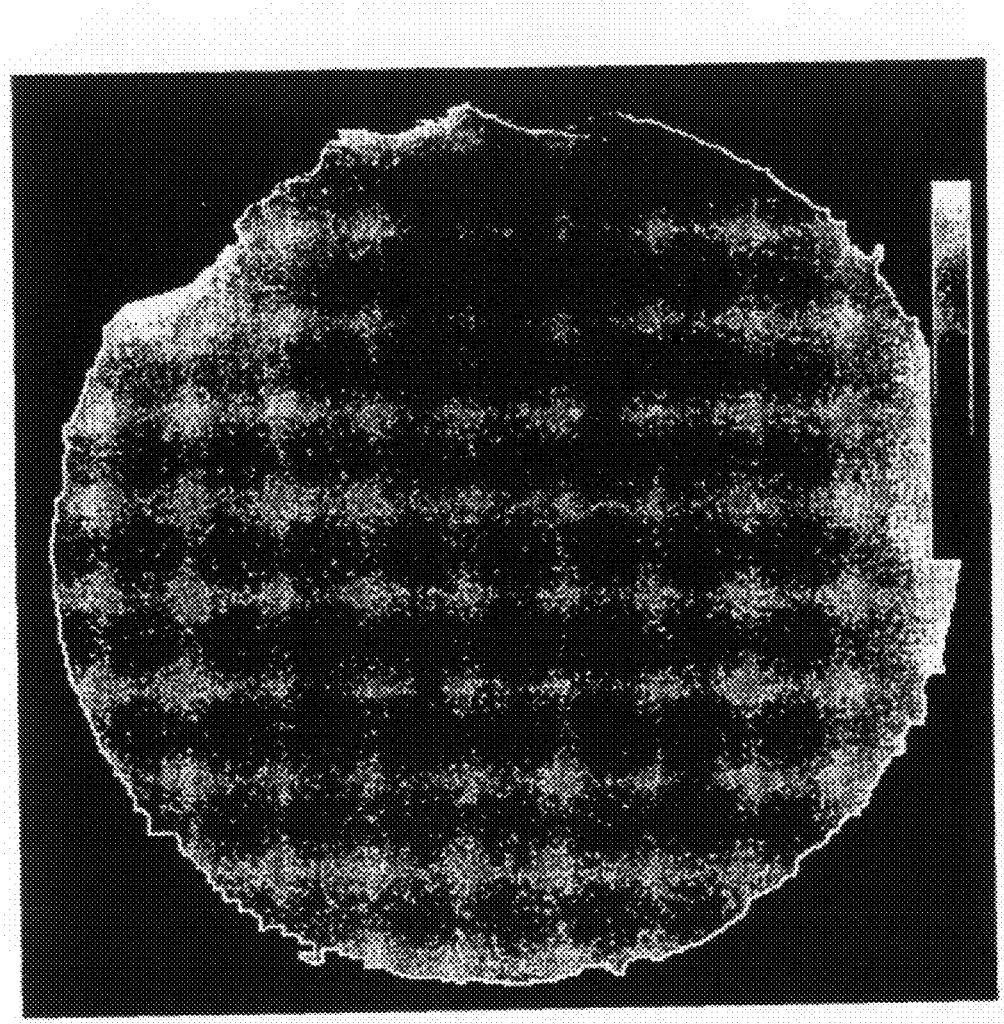

FIG. 11 shows a post-proceed disparity image, in which the background (non-plant parts) is shown in black. Scale: disparity range [610:620] pixels.

Figure 12:
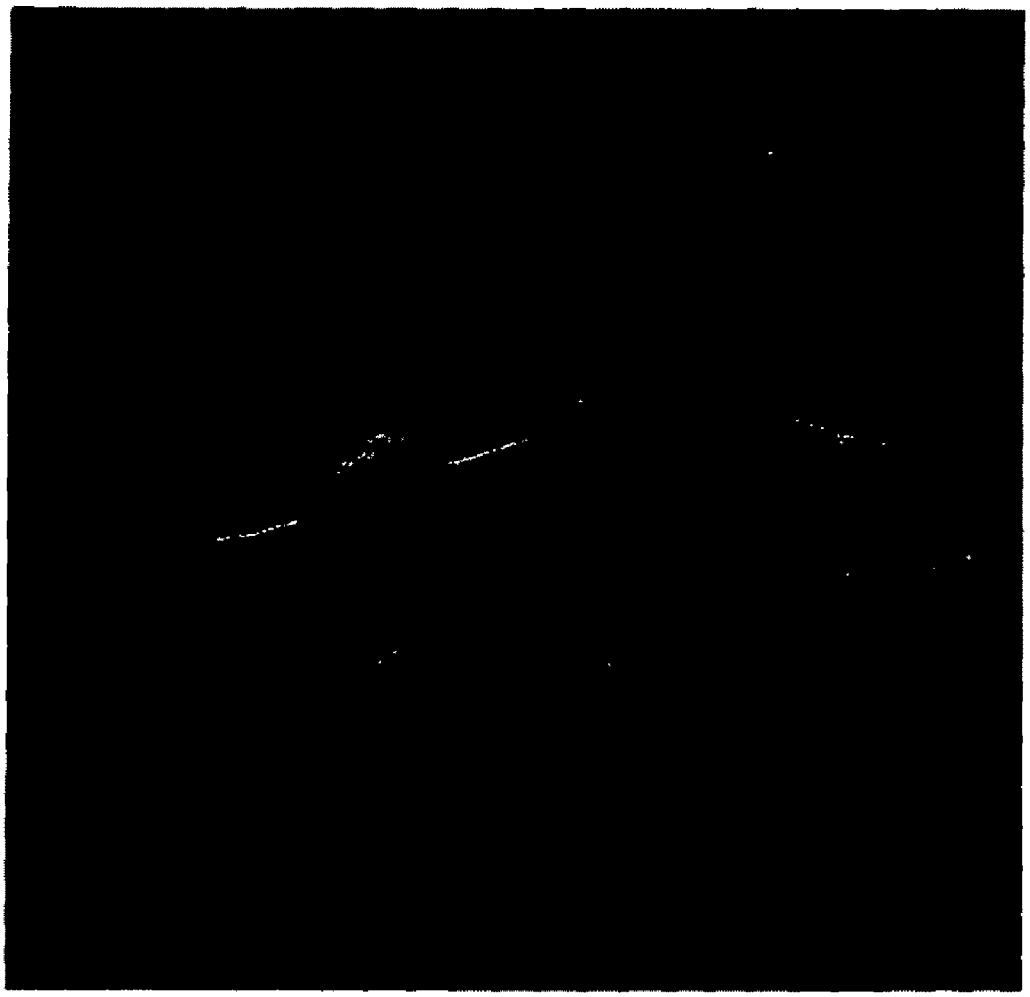

FIG. 12 is a 3D view of a reconstructed leaf disk.

Figure 13:
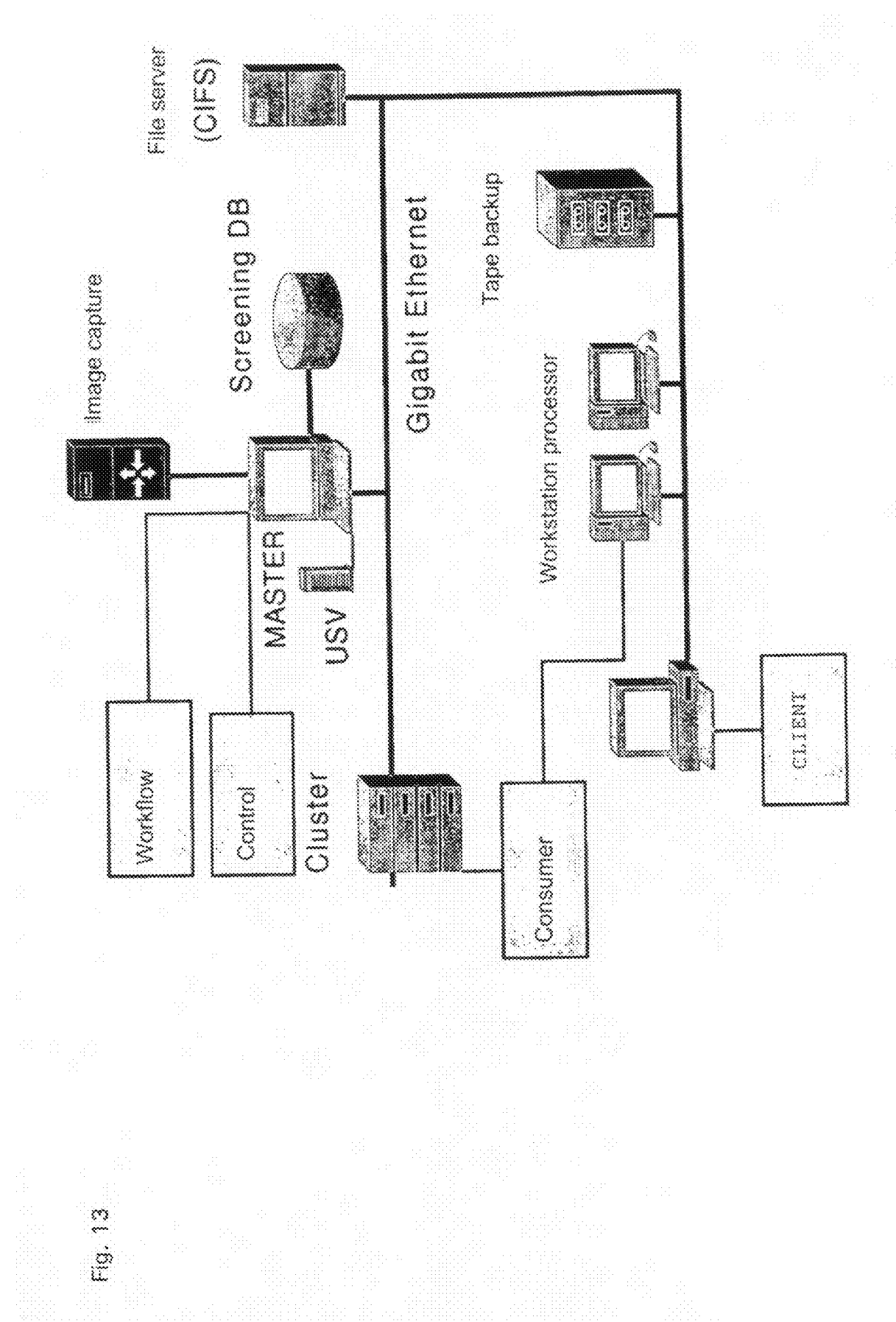

FIG. 13 is a distribution diagram for the method according to the invention. A gigabit network connects the MASTER (comprising image capture, database system and Workflow Engine), CLIENT computer, file server, backup system, and Linux cluster. Rectangular boxes: screening programs.

Figure 14:
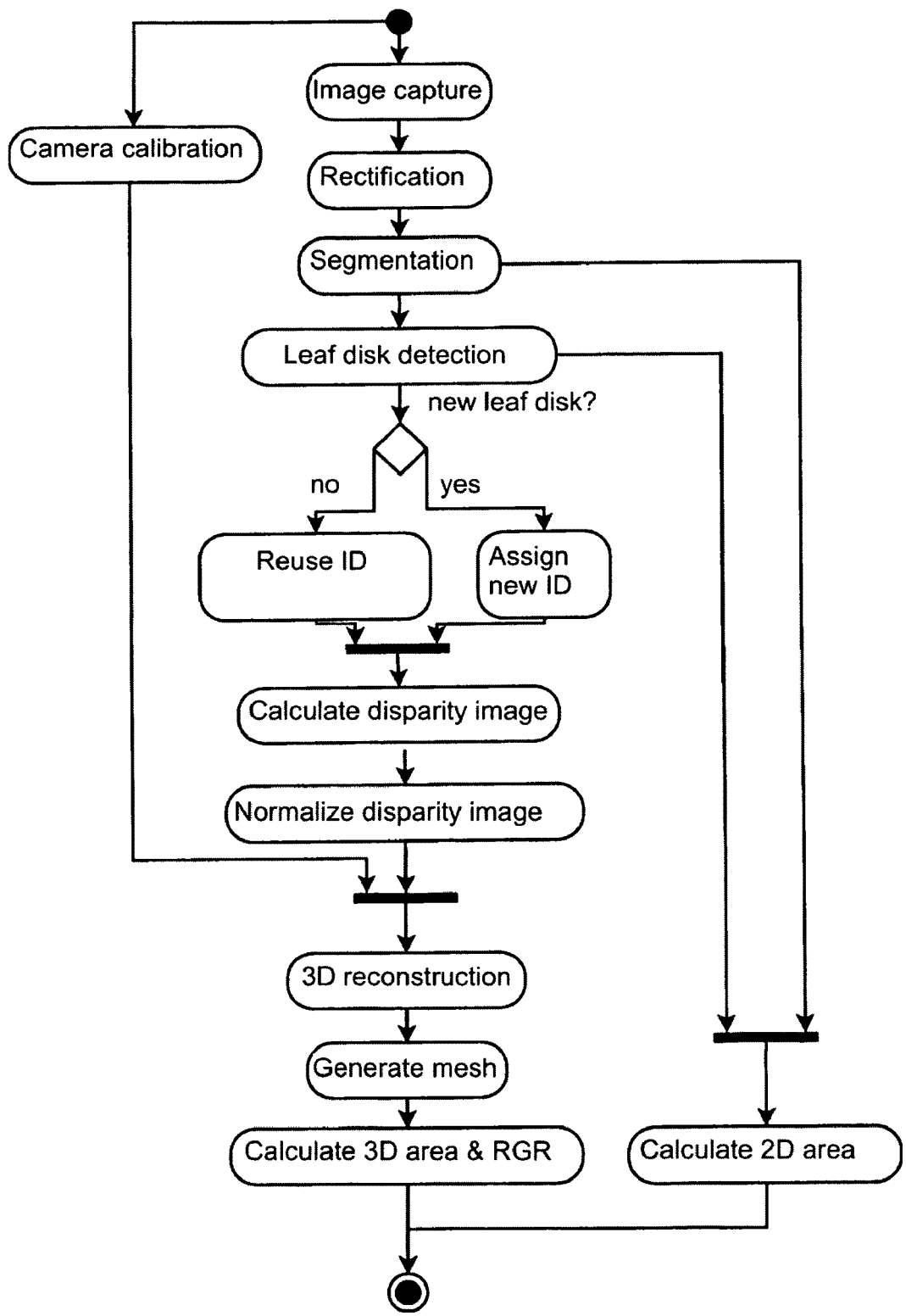

FIG. 14 is an activity diagram for key Workflow steps in UML (unified modeling language) notation. Workflow rules are stored in the rules database table. There are two different types of Workflow rules: (1) state-based rules, which are triggered for a certain combination of a step and the state of a job, and (2) code-based rules, in which program code is executed to determine whether a new job has to be generated (example: generation of overview images at the end of an image capture run).

Figure 15:
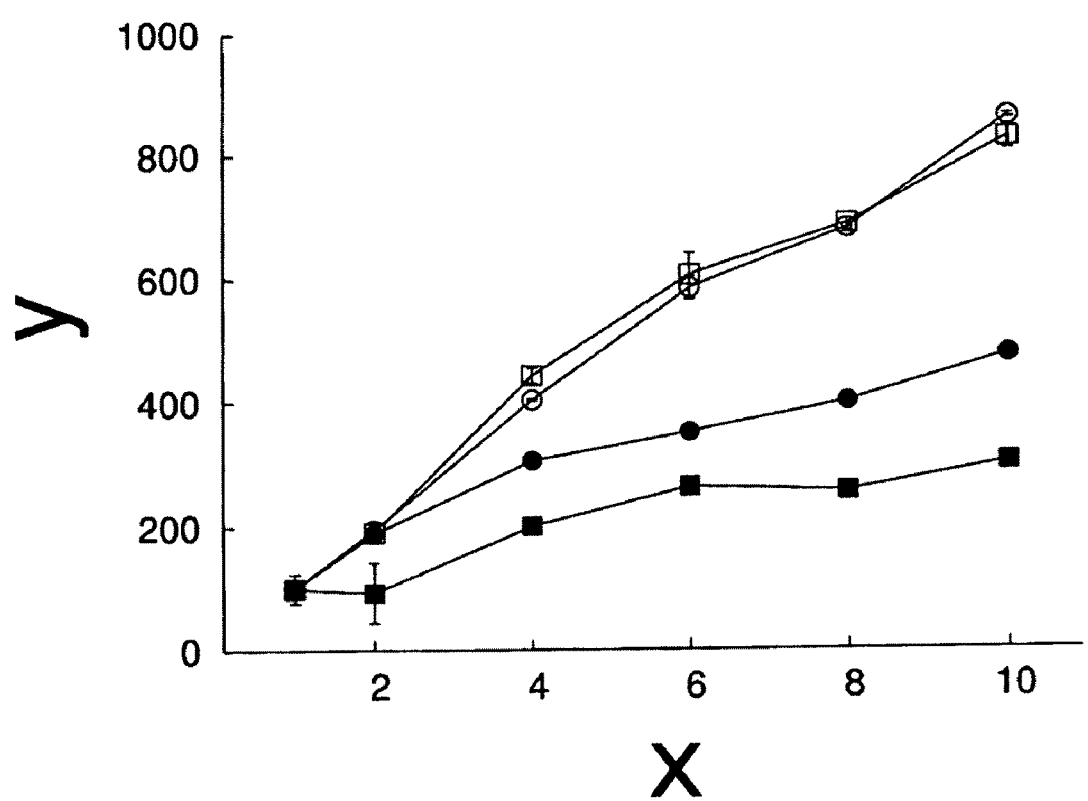

FIG. 15 shows scalability, which is to say, the behavior of a program with respect to the resource requirement with growing input quantities, here in particular the time requirement. x: number of CPUs used; y: % execution speed (standardized for sequential processing). Open squares: empty jobs; open circles: CPU_BOUND jobs; closed squares: IO_BOUND jobs; closed circles: MIXED jobs. Error bars show standard errors (n=3).

DESCRIPTION OF THE PREFERRED EMBODIMENTS

Embodiments will be provided hereinafter, which will describe the method according to the invention and the apparatus according to the invention in more detail.

Accuracy of the Method According to the Invention

To test the accuracy of the determination of the projected leaf area $A_P$ (projected leaf area), 24 leaf disks were punched out of *Nicotiana tabacum* and immediately scanned using a flat bed scanner (Epson Perfection 2480 Photo, Epson, Suwa, Japan) at a resolution of 400 dpi against a white background. The RGB image generated by the scanner was transformed in the HSV (hue, saturation, brightness value) color space. Subsequently, the leaf material was segmented into leaf and background by applying threshold values (minimum/maximum) to the H, S and V channels. This method is ideal for identifying chlorophyll because all the color information is available (Russ, 2002; Walter et al., 2007; Biskup et al., 2007). The coefficient of variation (CV) of the $A_P$ determined in this way was 3.8%, which is to say, the area of leaf disks punched out using a cork borer varied by 3.8%. In contrast, the CV of the area $A_P$ measured with the method according to the invention in 24 leaf disks was 3.2% and the CV of $A_{3D}$ (area of the leaf area reconstructed by means of the three-dimensional measurement method according to the invention) was 3.8%. In general, $CV(A_{3D})$ should take on larger values than $CV(A_P)$ because, while a cork borer cuts out leaf disks with a nearly perfect circular edge, the surface may be arched upward or undulated. The accuracy determination showed that the method according to the invention supplies a segmentation result that is equally as good as, if not better than, conventional image processing methods, despite lacking color information.

Figure 7:
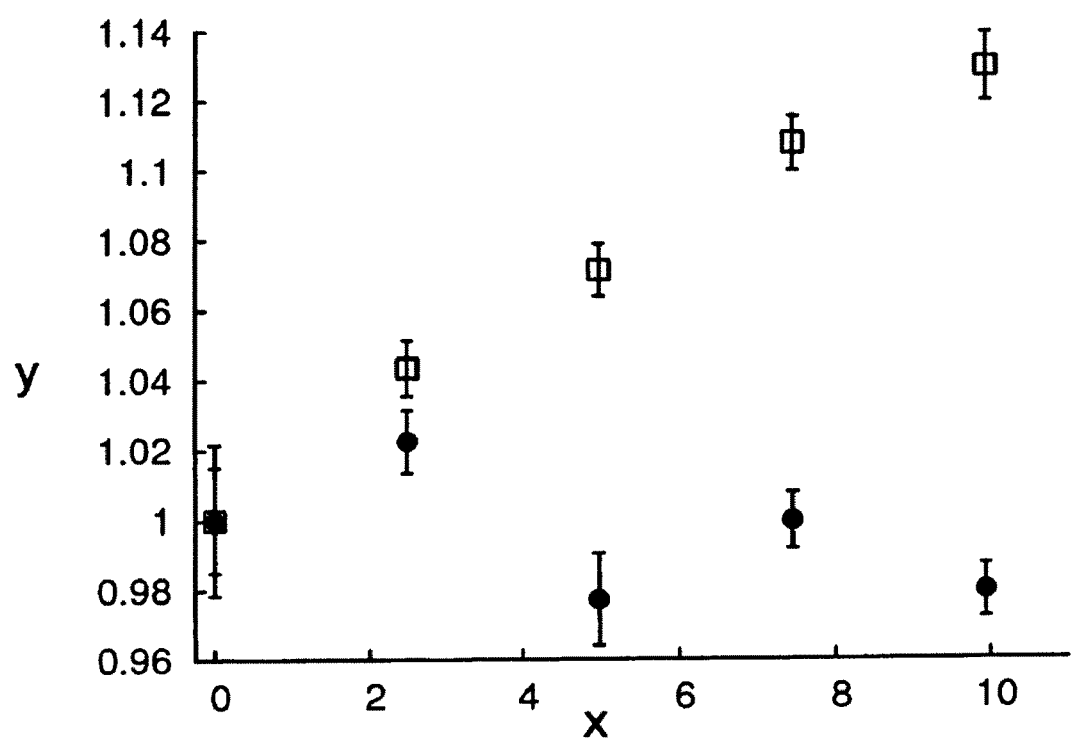
FIG. 7 shows area measurements of leaf disks having a constant size at various liquid levels. x: liquid level (mm), y: relative area (with respect to the area at a water level of 0 mm), the water level varying between 0 mm (bottom of the well of the microtiter plate) and 10 mm, average values for $A_p$ (open squares) and $A_{3D}$ (closed circles)±standard error; n=24.

To analyze the impact of the distance between the camera and the object on the accuracy of the area determination, images of floating leaf disks were taken at varying liquid levels. (FIG. 7). The projected leaf area $A_P$ was clearly distance-dependent; it rose by 14% as the distance of the camera was decreased by 10 mm. In contrast, $A_{3D}$ remained nearly constant, exhibiting a maximum variation of 2%. This clearly demonstrates the necessity of the 3D reconstruction method according to the invention presented here for precise growth measurement, if the measurement periods are so long that evaporation considerably lowers the liquid level.

Growth Analyses

A total of 458 leaf disks of Nicotiana tabacum were used for a growth measurement case study. Using the most rapid image capture possible, each leaf disk was captured once in 1.5 hours (one image pair per leaf disk). This corresponds to an average imaging time of 11.8 seconds per leaf disk, including camera positioning. The experiment was ended after 72 hours. In total, approximately 22,000 images were captured.

Image Processing System

Figure 1:
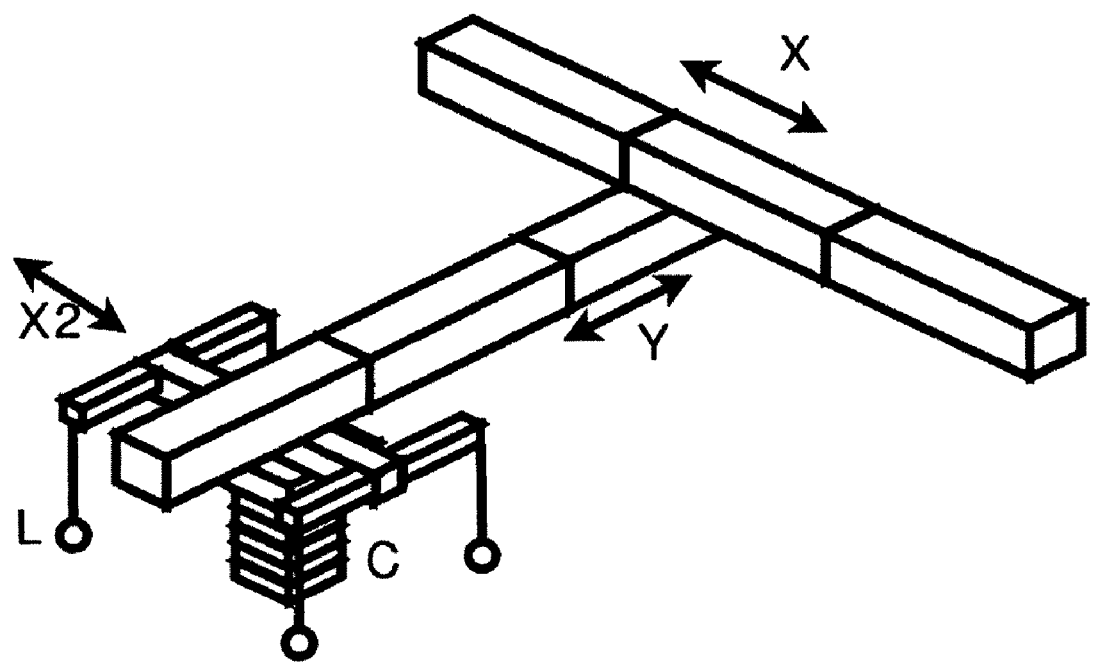
FIG. 1 is a schematic configuration comprising a capture system. X, Y, and X2=translation stages; the X translation stage is mounted to the configuration; arrows=directions of movement of the translation stages; L=infrared lamps; C=camera.
Figure 2:
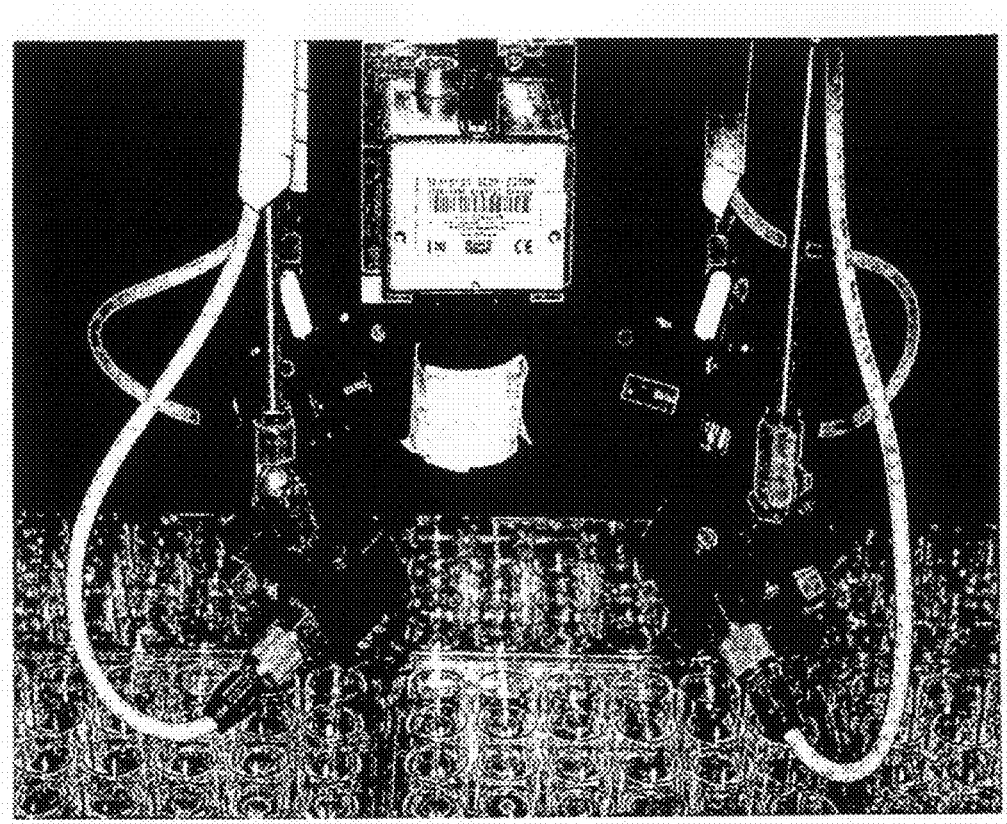
FIG. 2 shows a camera, which is surrounded by four LED arrays, disposed over a microtiter plate comprising leaf disks located therein.

The hardware configuration (FIGS. 1 and 2) is based on the design of the 2D screening system GROWSCREEN (Walter et al., 2007). The system according to the invention captures a rectangular measurement area of 58 cm×58 cm. Images are captured by means of a Point Grey Scorpion SCOR-20SOM camera (Point Grey Research, Vancouver, BC, Canada) (2 megapixels; maximum resolution 1600×1200 pixels) and transmitted by means of a FireWire 400 connector to the control computer (IEEE 1394a; maximum transmission rate: 400 Mbits). Images are captured through a C-mount lens (15 mm; Rodenstock, Munich, Germany) using an infrared (IR) filter (model 27 093; Schneider-Kreuznach, Bad-Kreuznach, Germany; transmissive at wavelengths over 800 nm). The camera is oriented perpendicularly downward. Four IR LED arrays are used for lighting during the image capture, each containing 18 LEDs ($\lambda_{max}$=800 nm; Conrad Electronic, Hirschau, Germany). IR lighting is physiologically inactive and has the added advantage of giving the plant material a higher-contrast appearance.

The LED lighting remains on during the entire experiment, so as to prevent temperature-dependent drifting of the lighting intensity. The LED arrays used did not approach 1% stable intensity until after more than 20 minutes. To reduce the image noise, 5 images are captured for each capture position and the mean value is found. The images are captured at a resolution of 1280×960 pixels and stored in the TIFF format, with lossless PackBits compression.

The camera and the IR lighting unit are moved in a horizontal plane by means of two high-precision translation stages ('X' and 'Y'; Pico-Maxi, type FMD-LPT80.550.1205-SM, Laser 2000 GmbH, Munich, Germany; microstepping motors: MDrive 23 Plus, Intelligent Motion Systems, Marlborough, USA). A third translation stage ('$X_2$') is used to displace the camera during the capture of stereo image pairs or series in the X-direction, while the position of the IR lighting unit remains unchanged. This is necessary because constant lighting is a prerequisite for stereo images. The entire capture and positioning system is mounted on a stable frame composed of X-95 profile elements (Linos Photonics, Göttingen, Germany).

Figure 8:
FIG. 8 shows a microtiter plate with leaf disks. Left half: treatment with nutrient solution. Right half: treatment with the herbicide glyphosate (images taken 72 hours after start of the experiment).

Leaf disks that have been analyzed are stored in microtiter plates comprising 24 wells (FIG. 8; Nunc, Roskilde Denmark). The wells are uniformly arranged and have a volume of 2.5 ml, respectively. For the duration of an experiment, the covers of the plates are removed to enable unimpaired gas exchange and prevent fogging. The test objects are supported on a jack (Swiss BOY 110, Rudolf Grauer A G, Degersheim, Switzerland), by means of which a suitable distance can be set for image capture. Horizontal orientation of both the positioning system and the test objects is ensured using a water level. The base is covered with a black plastic film to increase the contrast (and thereby facilitate the segmentation).

Computer System

FIG. 13 is a schematic illustration of the hardware components and the software components of the method according to the invention that run on the individual computer systems. Image capture is carried out on a personal computer (PC), referred to as the MASTER; Intel® Pentium® 4 dual-core, 2 GB DDR400 RAM (Intel, Santa Clara, USA), SuSE Linux 10.2; SuSE, 2006). A multiuser database (see below) runs on this PC. A plurality of other PCs (Cluster node; 1 GB DDR 400 RAM, SuSE Linux 10.2 (Novell, Provo, USA)) are available to the screening system for automatic image evaluation. All the computers used are connected via a gigabit network to cope with the high data volume.

Data Management

Data that develops is managed by a MySQL database (MySQL AB, Uppsala, Sweden) and on a file server. Master data and dynamic data for the screening system are stored in the database and can be retrieved via the network. The database forms the primary interface for communication between the core application and the cluster node.

Images and other mass data are stored on the file server. This server is accessible to the MASTER and to all the nodes via the Common Internet File System (CIFS). Files on this server are referenced based on their path names. The database stores meta information on the mass data (file type, generation date, origin).

Parallelization and Workflow Concept

The images that were captured were processed in accordance with the Workflow Paradigm (Ellis, 1999). The overall project is divided into a series of separate Workflow steps. In this way, 1.) processing steps can be reused in other Workflows, 2.) evaluation is easy to parallelize, and 3.) individual steps can be easily carried out again, for example after changing configuration parameters. FIG. 14 shows the individual steps for calculating the 3D area of leaf disks.

1.) Calibrating the Capture System a) Camera Calibration

Before an experiment is executed, the camera is calibrated using an established method (Zhang, 1999; Zhang, 2000): At least 30 images of a checkerboard pattern were captured from various orientations. The intrinsic parameters of the camera (focal length, principal point, radial and tangential distortion) were estimated using the OpenCV implementation of the Camera Calibration Toolbox by J. Y. Bouguet (Intel, Santa Clara, Calif., USA).

b) Stereo Calibration

The parameters of the stereo system (rotation and translation of the right camera system with respect to the left one) were determined as follows: The stereo baseline is known from the high-precision translation stages that were used. However, because the CCD sensor of the camera can be easily rotated in relation to the displacement direction as a result of the installation, a correction may be required. If there is rotation, this is linearly dependent on the displacement distance. This can impair the quality of the stereo correspondence search, because the algorithm used assumes that the camera displacement takes place along the rows of the camera sensor (in the X-direction) and a correspondence search would therefore likewise only be expected in a row. For this reason, at least 40 correspondences are determined for correction purposes using the Hugin panorama-stitching software, whereafter the rotation is estimated. Then, the right image is rotated so that the image row and displacement direction agree again. This procedure is required only once after installation of the camera. As an alternative, it is possible, for example, to perform stereo calibration using the Camera Calibration Toolbox by J. Y. Bouguet (Intel, Santa Clara, Calif., USA) mentioned above.

2.) Image Capture

Figure 3:
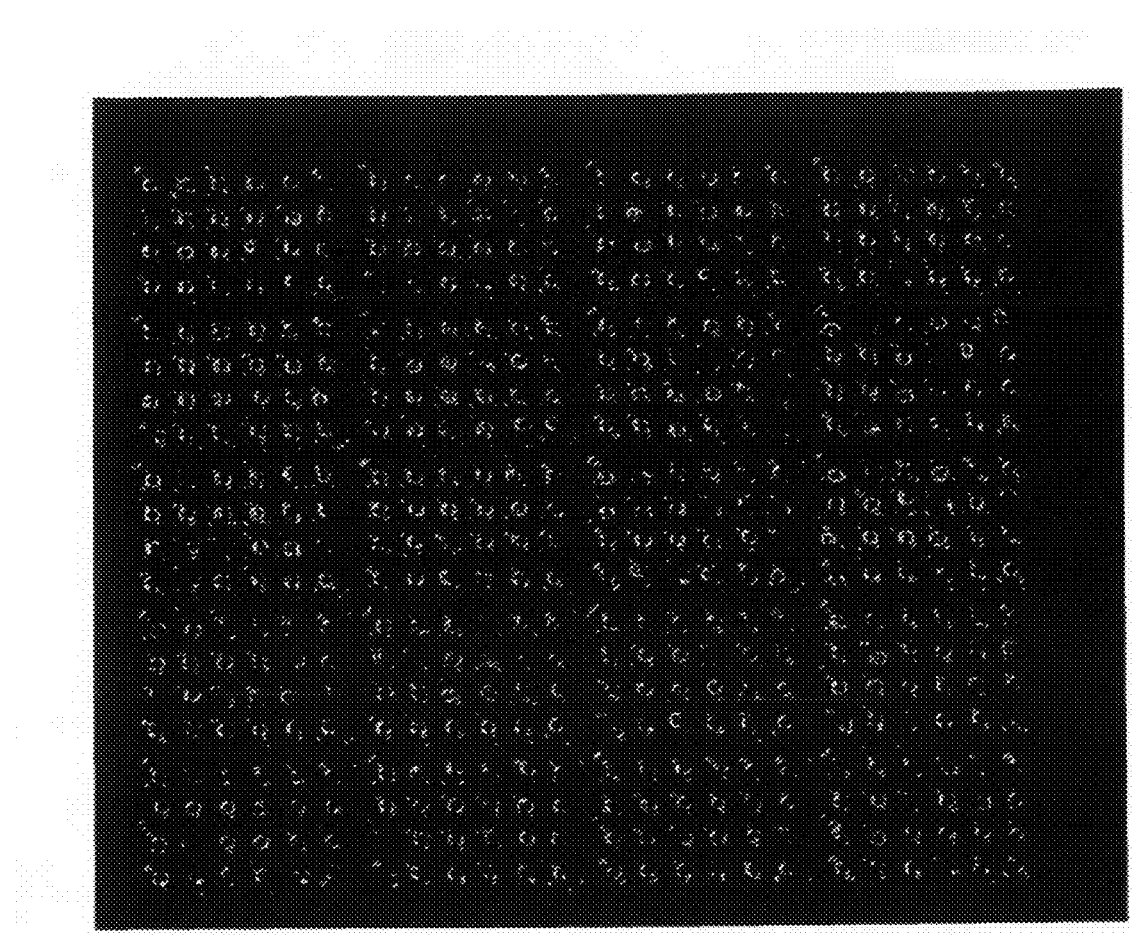
FIG. 3 is an overview image composed of 395 individual images, captured with infrared lighting.
Figure 4:
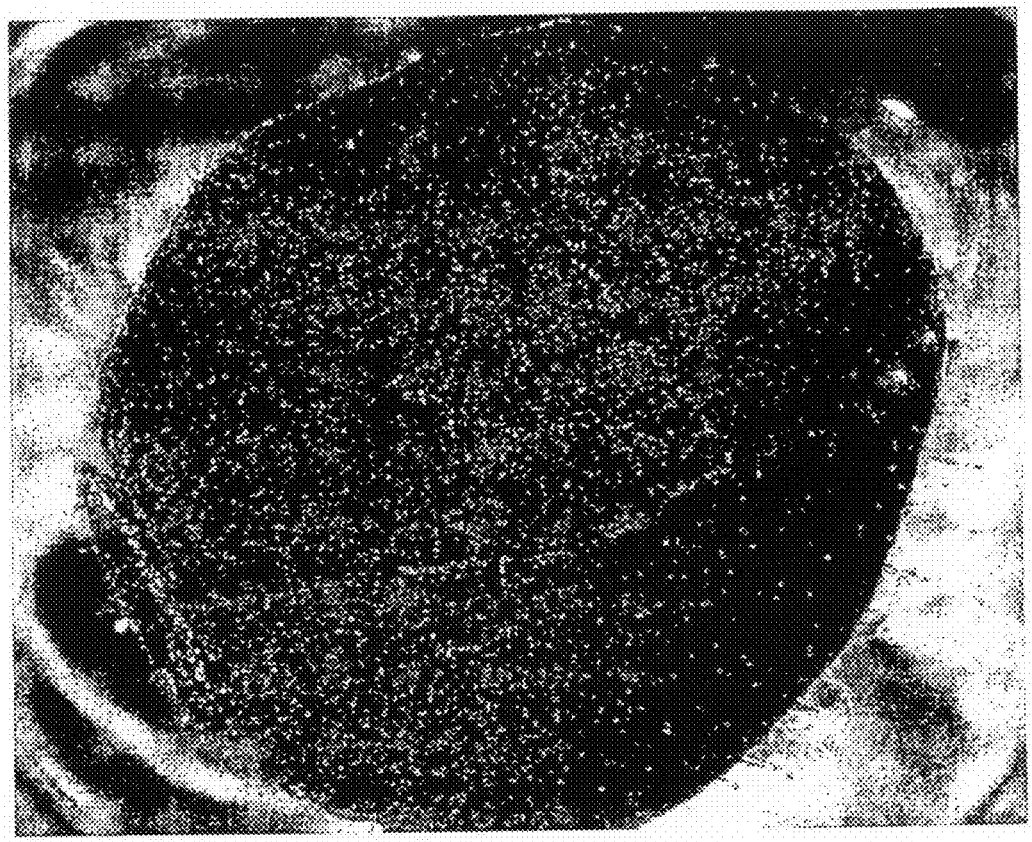
FIG. 4 shows a leaf disk of Nicotiana tabacum, floating on solution, the surface bang slightly curved.
Figure 5:
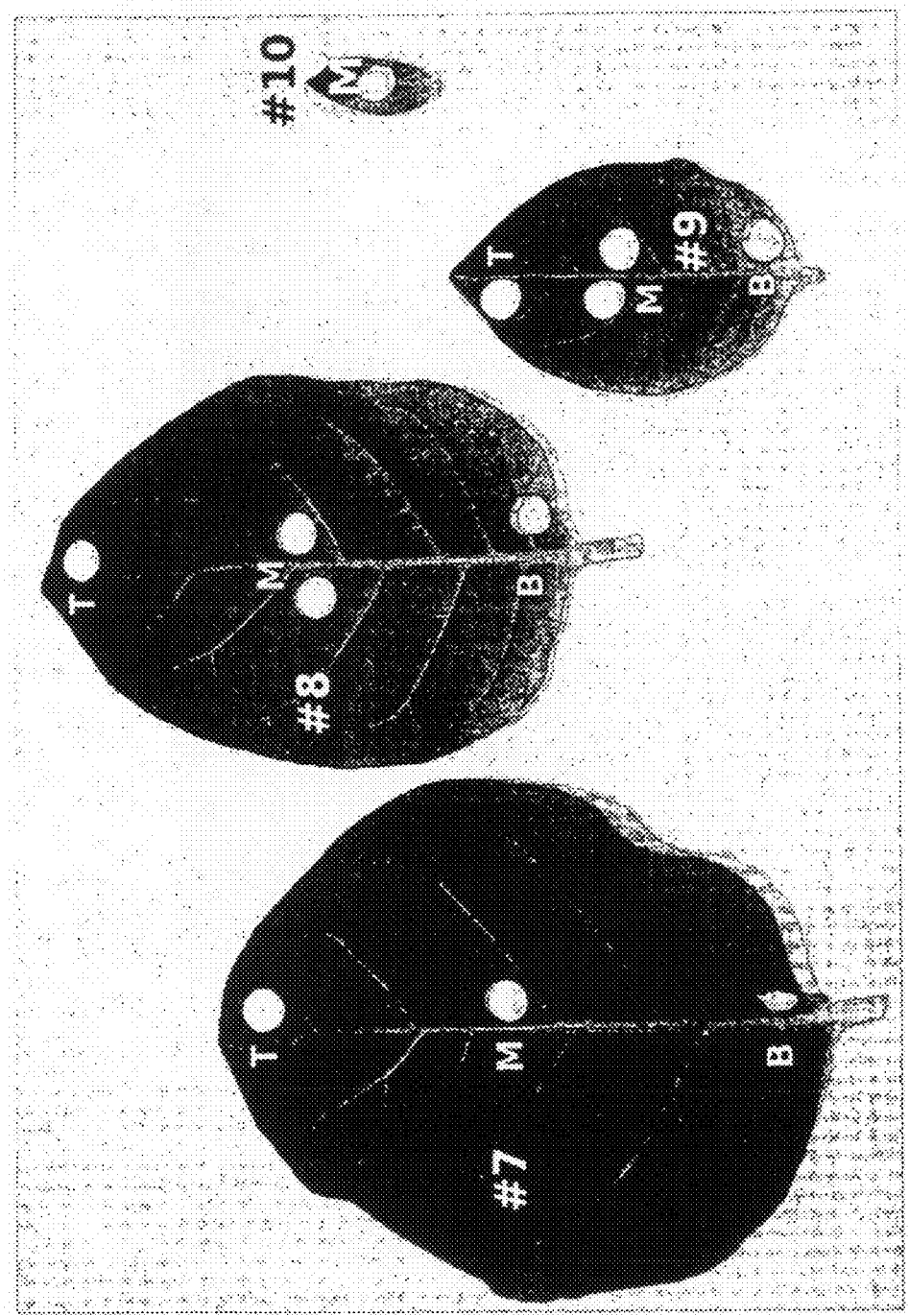
FIG. 5 shows leaves including leaf numbers (counted starting at the base of the plant, including cotyledons) and punch-out position along the center vein (B: base; M: middle; T: tip).
Figure 6:
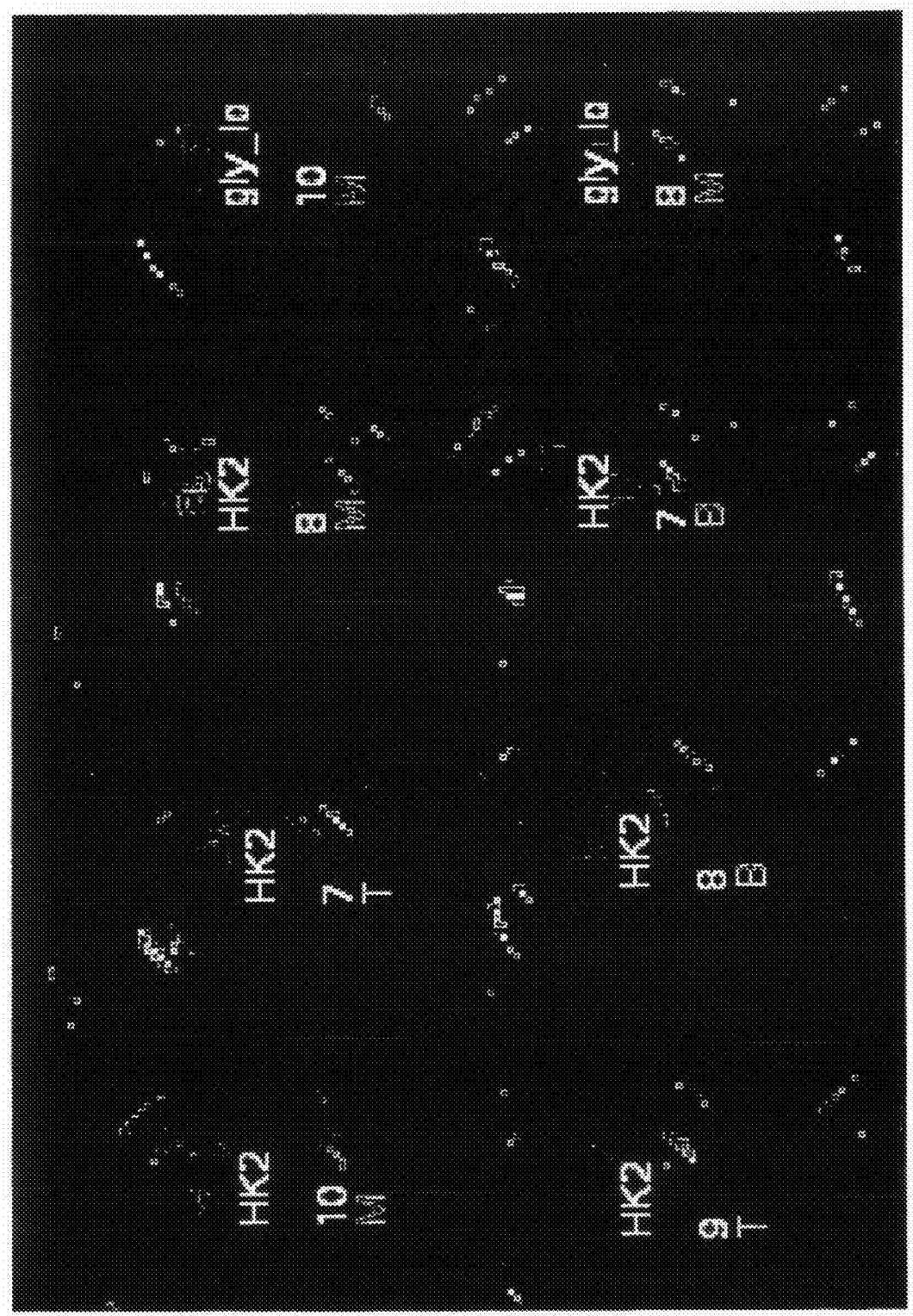
FIG. 6 is a detail view of an overview image composed of multiple individual images and superimposed information on the individual leaf disks (plant identification number, treatment, leaf number, punch-out position).

Predefined image capture positions (FIG. 3) are searched in the optimal sequence (according to Dijkstra's algorithm; Dijkstra, 1959) so as to minimize the positioning duration. For each capture position, two images are captured with a base (distance between camera centers) of b=20 mm. It is desirable to select b as large as possible, because the resulting larger disparities allow for better depth resolution. On the other hand, b is limited by the size of the lens coverage and the leaf disk. The selected base of b=20 mm ensured that the leaf disks were visible in the left image and in the right image for the duration of an experiment.

3.) Segmentation/Detection of Leaf Disks

The biological necessity of using infrared instead of white light illumination during image capture makes segmentation more difficult: color images can be easily and precisely segmented (Russ, 2002; Walter et al., 2007). Because of the limited spectrum with IR lighting, however, only gray scale images can be captured. The use of a dark background is advantageous, but the well walls of the microtiter plates cannot be separated from the leaf disks based solely on the gray scale value. For this reason, the following segmentation procedure was employed:

Intensity fluctuations (due to uneven lighting) in the captured images $I_{acq}$ are corrected by means of reference background images (Jähne, 2002).

Threshold segmentation: Binary masks ($M_t$) of the captured images are generated by applying a minimal and a maximal threshold value. Depending on the lighting intensity and brightness of the leaf disk, these values are determined by incrementally varying and comparing the generated mask to the visually recognizable boundaries of the leaf disk.

Morphological erosion: The edges of the masks are morphologically eroded (Jähne, 2002). This removes irregularities of the object contours. Then, the center of gravity $c_i$ of each potential leaf disk is calculated from the remaining pixels.

Figure 9:
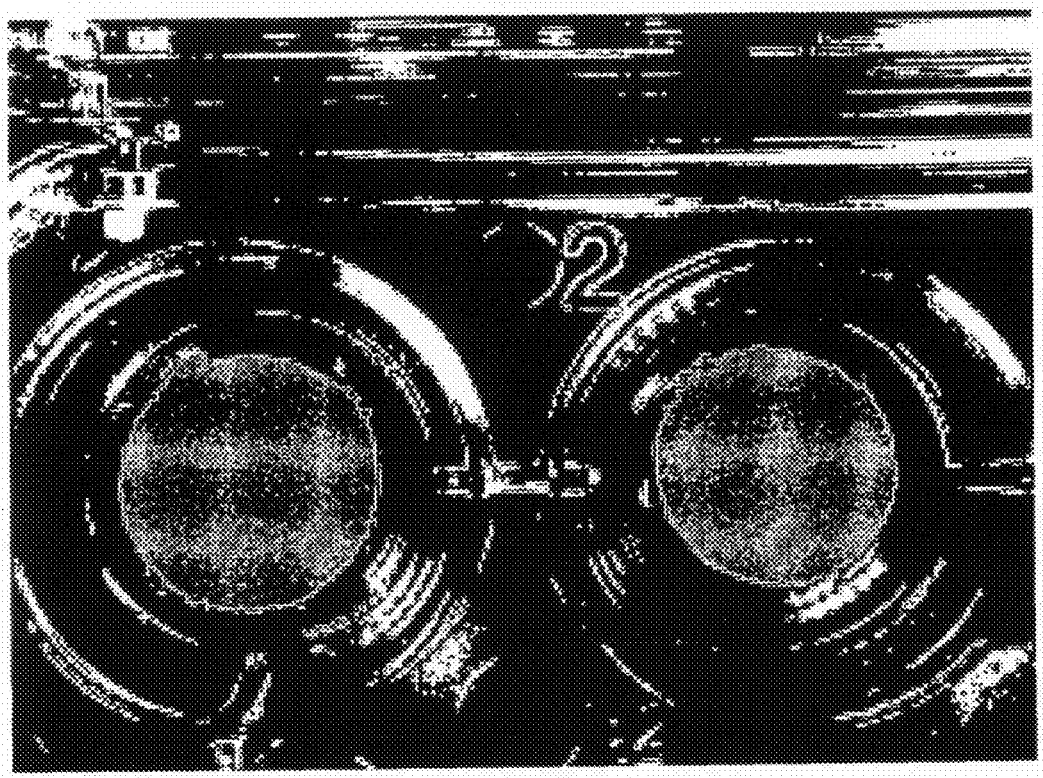
FIG. 9 shows a binary mask $M_t$, generated by threshold segmentation of the gray scale image (white: foreground, black: background; gray: leaf disk, detected by calculation of $$\frac{\partial A_p}{\partial r}.$$

Edge cleaning: The increase in the pixel count (pixel area) with increasing distance r from $$c_i, \frac{\partial A_p}{\partial r},$$

is used to detect the edge of a leaf disk. The radius $r_{max}$, at which $$\frac{\partial A_p}{\partial r}$$

drops below 0.6 times the theoretical increase of a disk, $2\pi r$, is used as the edge criterion for segmentation (FIGS. 9 and 10). In this way, the final segmentation mask $M_s$ is created. Potential leaf disks from both images of an image pair are brought into agreement based on the actual and the expected disparity.

If no leaf disk was previously detected at the particular position, the new leaf disk is entered in the database with an unambiguous identifier, the plant identification number.

The projected leaf area $A_P$ is calculated as the sum of the non-zero pixels in $M_s$ of the first image of an image pair at a particular position.

To reduce the data volume, only those image sections in which leaf disks are present are used for further processing steps.

4.) Stereo Correspondence Search and 3D Reconstruction

Image pairs of leaf disks from the previous processing steps are used to calculate depth maps by means of 2-camera stereo.

Images are rectified, which is to say straightened. To this end, the orientation of the image is straightened or corrected so that displacements (disparities) occur only in the X-direction. The scan rows of the camera sensor thereby agree with the direction of movement of the camera (see stereo calibration).

A correlation-based stereo algorithm (Faugeras et al., 1993; Biskup et al., 2007) is applied to the rectified image pairs. For each picture point in an image, the algorithm attempts to determine the displacement of the corresponding point in the other image (=correspondence search). A correlation function $c_2$, for example such as that of Faugeras et al. (1993), is used to compare rectangular image regions. Because of the stereo geometry that is used and the previously conducted rectification, only horizontal displacements are possible. Consequently, the correspondence search only constitutes a 1D problem instead of a 2D problem (Hartley and Zisserman, 2004; Trucco and Verri, 1998). The result of the correspondence search is a disparity image D.

Post-processing: Outliers in D are removed by means of a median filter (radius: 25 pixels) (Kiette and Zamperoni, 1995). Outliers are implicitly those pixels that are very small or very large as compared to the surroundings. All pixels in the surroundings are sorted according to the value thereof, and the median value is added to the list. In this way, a rank is generated.

Because areas are to be calculated at the end of the processing steps, holes which may be present in the reconstructed leaf disks must be closed. This is done by the interpolation of points for which no disparity assessment was possible, using normalized convolution (Knutson and Westin, 1993). The post-processing step supplies a smoothed disparity image $D_{geg}$.

The 3D position of all points in $D_{geg}$ is triangulated based on the intrinsic and extrinsic parameters of the stereo system. In this way, the coordinate grid W is created, in which the euclidean coordinates X, Y and Z are stored.

5.) Smoothing the Surface Model

The depth Z of the reconstructed 3D point cloud is smoothed using a disk-shaped median filter (Jähne, 2002) (radius: 15 pixels) so as to remove small-scale irregularities of the surface.

The 3D model is subsampled (at every 7th point in the X and Y directions) and the 3D area $A_{3D}$ of a leaf disk is determined based on the known neighboring relationships of the individual points on the surface:

$$A_{3D} = \sum_{y=1}^{h} \sum_{x=1}^{w} A_\Delta(W_{x,y}, W_{x-1,y}, W_{x-1,y-1})$$

where:

h=height of the image w=width of the image $A_\Delta$=triangular area

W=coordinate grid $W_{xy}$=grid position with the triangular area $A_\Delta$ being defined by three 3-vectors.

6.) Determining Growth Rates

Assuming exponential growth rates in the form $A(t_2)=A(t_1)e^{RGR(t_2-t_1)}$, relative growth rates (RGR) of leaf tissue are defined by $$RGR[d^{-1}] = \frac{100}{t_2 - t_1} \ln\left(\frac{A(t_2)}{A(t_1)}\right)$$

with the projected or 3D leaf areas $A(t_2)$ and $A(t_1)$ at two consecutive points of time $t_2$ or $t_1$ and $d^{-1}$=per day (for example, Walter and Schurr, 1999).

Software Architecture

The method according to the invention primarily employs open source software. The client software (CLIENT program) is implemented in C++/Qt (Trotttech, Oslo, Norway). The primary objectives of the CLIENT program are 1.) to parameterize new measurement campaigns (measurement intervals and the like); 2.) to adjust cameras and translation stages; 3.) to generate an overview image of the entire work region, by means of which leaf disks to be captured can be selected; and 4.) to monitor the running system (status of the evaluation, system load, and the like). The CLIENT program runs on Linux and Win32 operating systems.

Performance Characteristics

To measure the performance characteristics of the distributed system, the average execution time of different, artificial evaluation jobs was analyzed (Table 1). The measurements were repeated using different numbers of Cluster nodes in order to determine the scalability. The distributed system for the performance test included a 64-bit 2.6 GHz dual-core computer with MySQL database and capture software, and five 32-bit Intel® Pentium® 4 dual-core computers for the evaluation (Cluster nodes). In the maximum configuration, two consumer processes were carried out simultaneously on each Cluster node.

TABLE 1

Artificial jobs for determining the time response with rising load (scaling properties) of the method according to the invention

| Job type | Description | Average duration in the sequential mode (s) |
| --- | --- | --- |
| EMPTY | Pure overhead; no calculation | 0.02 |
| CPUBOUND | Calculation only | 46 |
| MIXED | Calculation and generation of a 10 MB file | 14 |
| IOBOUND | Generation of a 10 MB file (size of a typical job output) | 3 |

FIG. 15 shows the scalability when executing different artificial jobs. EMPTY and CPU_BOUND jobs have similar characteristics. They scale almost linearly over a range of 1 to 10 CPUs. IO_BOUND jobs scale more poorly. With the 10 CPUs that are used, an increase in throughput of only 200% compared to one CPU is achieved. Typical evaluation jobs behave rather like CPU_BOUND jobs, because only the data traffic from and to the file server, and not the local data traffic, impair the execution speed of other nodes.

Server Programs

The server programs are implemented in the programming language Python (Van Rossum, 2006). Performance-critical parts are implemented in C++. Python links for C and C++ libraries were generated with the Simplified Wrapper Interface Generator (SWIG).

The WORKFLOW program periodically checks the job database table for jobs that have reached a timeout or in which the execution returned an error (ERROR state), and has them executed again. Moreover, Workflow rules are applied, whereby new jobs are optionally generated.

The CONSUMER program runs on each Cluster node and executes jobs there in the NEW state. Using multi-core processors, CONSUMER is started once for each processor core that is present.

The WATCHDOG program regularly checks the database and file system for problems (functional failure, insufficient disk space) and, if required, informs the system administrator by e-mail.

LITERATURE

Biskup B., Scharr H., Schurr U. & Rascher U. (2007) A Stereo capture system for measuring structural parameters of plant canopies. *Plant, Cell and Environ.* 30, 1299-1308.

Dijkstre E. W. (1959) A note on two problems in connexion with graphs. *Numer. Math.* 1: 269-271

Ellis C. A. (1999) Workflow technology. In: Beaudouin-Lafon, M. (Ed.), Computer Supported Co-operative Work Trends in Software 7, 29-54. John Wiley & Sons Ltd., Chichester, UK Faugeras O., Hotz B., Mathieu H., Viéville T., Zhang Z., Fua P., Théron E., Moll L., Berry G., Vuillemin J., Bertin P., Proy C. (1993) Real time correlation-based stereo: algorithm implementations and applications. Technical Report 2013, INRIA Sophia Antipolis Granier C., Aguirrezabal L., Chenu K., Cookson S. J., Dauzat M., Hamard P., Thioux J., Rolland G., Bouchier-Combaud S., Lebaudy A., Muller B., Simonneau T. & Tardieu F. (2006) PHENOPSIS, an automated platform for reproducible phenotyping of plant responses to soil water deficit in *Arabidopsis thaliana* permitted the identification of an accession with low sensitivity to soil water deficit. *New Phytol.* 169, 623-635.

Jähne B. (2002) Digital Image Processing (3rd ed.): Concepts, algorithms, and scientific applications. Springer-Verlag, London, UK Jenness J S (2004) Calculating landscape surface area from digital elevation models. *Wildlife Society Bulletin* 32, 829-839

Kaminuma E., Heida N., Tsumoto Y., Yamamoto N., Goto N., Okamoto N., Konagaya A., Matsui M., and Toyoda T. (2004) Automatic quantification of morphological traits via three-dimensional measurement of *Arabidopsis*. *Plant J.* 38, 358-65.

Klette R., Zamperoni P., (1995) Handbuch der Operatoren für die Bildverarbeitung [Handbook of operators for image processing]. Braunschweig-Vieweg, 2nd edition Scharr H. (2004). Optimal filters for extended optical flow. In International Workshop on Complex Motion (IWCM) 14-29.

Russ J. C. (2002) The image processing handbook. CRC Press, Inc., Boca Raton, Fla.

Walter A, Schurr U (1999) The modular character of growth in *Nicotiana tabacum* plants under steady-state nutrition. *J. Exp. Bot.* 50: 1169-1177

Walter A. (2000) Räumliche und zeitliche Wachstumsmuster in Wurzeln und Blättern dikotyler Pflanzen [Spatial and temporal growth patterns in roots and leaves of dicotyledonous plants]. Dissertation, Univ. Heidelberg.

Walter A., Scharr H., Gilmer F., Zierer R., Nagel K. A., Ernst M., Wiese A., Virnich O., Christ M. M., Uhlig B., Jiinger S. & Schurr U. (2007) Dynamics of seedling growth acclimation towards altered light conditions can be quantified via GROWSCREEN: a setup and procedure designed for rapid optical phenotyping of different plant species. *New Phytol.* 174, 447-455.

Zhang Z. (1999) Flexible camera calibration by viewing a plane from unknown orientations. In: Int. *J. Comput. Vision* 666-673.

Zhang Z. (2000) A flexible new technique for camera calibration. *IEEE T. Pattern Anal.* 22: 1330-1334.

The invention claimed is:

1. A method for measuring the growth of leaf disks, comprising the following steps:
 a) calibrating a capture system and determining calibrating parameters of the capture system;
 b) capturing at least one stereo image pair of a leaf disk using the calibrated capture system;
 c) processing each capture image, comprising;
  i) segmenting the leaf disks by threshold segmentation,
  ii) carrying out morphological erosion steps on the segmented images,
  iii) carrying out an edge cleaning to remove the edge of the storage vessel and detecting the edge of the leaf disk on the morphologically eroded images,
 (d) determining the projected leaf area $A_p$ of the leaf disk from the edge-cleaned images
 e) carrying out a 3D reconstruction comprising: generating a disparity image D by means of a stereo algorithm from the captured image pairs;
 calculating a 3D surface model based on the previously determined calibration parameters from the disparity image;
 f) smoothing the previously obtained surface model;
 g) determining the 3D area $A_{3D}$ of the leaf disk from the smoothed surface model;
 h) repeating the image capture according to step b) at different times;
 i) generating time series of the determined areas by evaluating the images that; were captured at different times in accordance with steps c-g)
 j) determining the growth rates of the leaf disk from the time series of the determined areas.

2. The method according to claim 1, wherein the calibration of the capture system at least 30 images of a checkerboard pattern are captured from different orientations, and the camera parameters of focal length, point of intersection of the optical axis with the image plane, and radial and tangential distortion are determined.

3. A method according to claim 1, wherein during the image capture two pictures are captured for each capture position, wherein the base b is selected so as to be large enough that the leaf disks are visible in the left and in the right image.

4. A method according to claim 1, wherein during the threshold segmentation, binary masks ($M_t$) are generated by applying a minimal and a maximal threshold value, wherein these values are determined by incrementally varying and comparing the generated binary mask to the visually recognizable boundaries of the leaf disk.

5. A method according to claim 1, wherein during the edge cleaning the increase in the pixel count or pixel area with increasing distance r from the center of gravity $c_i$ of the leaf disk, $$\frac{\partial A_p}{\partial r},$$

is used to detect the edge of the leaf disk.

6. A method according to claim 1, wherein during the generation of the disparity image D by means of the stereo algorithm for each picture point in an image, the displacement of the corresponding point in the other image is determined.

7. A method according to claim 2, wherein during the image capture two pictures are captured for each capture position, wherein the base b is selected so as to be large enough that the leaf disks are visible in the left and in the right image.

8. A method according to claim 2, wherein during the threshold segmentation, binary masks ($M_t$) are generated by applying a minimal and a maximal threshold value, wherein these values are determined by incrementally varying and comparing the generated binary mask to the visually recognizable boundaries of the leaf disk.

9. A method according to claim 3, wherein during the threshold segmentation, binary masks ($M_t$) are generated by applying a minimal and a maximal threshold value, wherein these values are determined by incrementally varying and comparing the generated binary mask to the visually recognizable boundaries of the leaf disk.

10. A method according to claim 2, wherein during the edge cleaning the increase in the pixel count or pixel area with increasing distance r from the center of gravity $c_i$ of the leaf disk, $$\frac{\partial A_p}{\partial r},$$

is used to detect the edge of the leaf disk.

11. A method according to claim 3, wherein during the edge cleaning the increase in the pixel count or pixel area with increasing distance r from the center of gravity $c_i$ of the leaf disk, $$\frac{\partial A_p}{\partial r},$$

is used to detect the edge of the leaf disk.

12. A method according to claim 4, wherein during the edge cleaning the increase in the pixel count or pixel area with increasing distance r from the center of gravity $c_i$ of the leaf disk, $$\frac{\partial A_p}{\partial r},$$

is used to detect the edge of the leaf disk.

13. A method according to claim 2, wherein during the generation of the disparity image D by means of the stereo algorithm for each picture point in an image, the displacement of the corresponding point in the other image is determined.

14. A method according to claim 3, wherein during the generation of the disparity image D by means of the stereo algorithm for each picture point in an image, the displacement of the corresponding point in the other image is determined.

15. A method according to claim 4, wherein during the generation of the disparity image D by means of the stereo algorithm for each picture point in an image, the displacement of the corresponding point in the other image is determined.

16. A method according to claim 5, wherein during the generation of the disparity image D by means of the stereo algorithm for each picture point in an image, the displacement of the corresponding point in the other image is determined.

* * * * *